(12) United States Patent
Behnke et al.

(10) Patent No.: US 6,648,401 B2
(45) Date of Patent: Nov. 18, 2003

(54) MOTOR VEHICLE BODY WITH WHEELHOUSE/UNDERBODY REINFORCEMENT

(75) Inventors: Guenter Behnke, Cologne (DE); Thomas Doerfler, Erftstadt (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/187,871

(22) Filed: Jul. 3, 2002

(65) Prior Publication Data

US 2003/0042762 A1 Mar. 6, 2003

(30) Foreign Application Priority Data

Jul. 5, 2001 (EP) .............................................. 01116270

(51) Int. Cl.[7] .............................................. B62D 23/00
(52) U.S. Cl. ..................... 296/198; 296/203.04; 296/30
(58) Field of Search ................................ 296/198, 204, 296/203.04, 29, 30, 188

(56) References Cited

U.S. PATENT DOCUMENTS 4,471,992 A * 9/1984 Matsuura et al. ........... 296/209
4,557,519 A * 12/1985 Matsuura .................... 296/204
5,997,068 A * 12/1999 Matsushita ................... 296/63

FOREIGN PATENT DOCUMENTS

| JP | 2-147480 | * | 6/1990 |
| JP | 05-338558 | * | 12/1993 |
| JP | 06-166385 | * | 6/1994 |
| JP | 11-198863 | * | 7/1999 |
| JP | 11-348826 | * | 12/1999 |

* cited by examiner

Primary Examiner—Joseph D. Pape
(74) Attorney, Agent, or Firm—Cary A. Smith

(57) ABSTRACT

A motor vehicle body has an underbody and a wheelhouse at an outboard edge of the underbody, and a longitudinal member beneath the underbody and adjacent to the wheelhouse, the wheelhouse having an inboard surface spaced outboard from the longitudinal member, and a reinforcement extending between and secured to the inboard surface and the longitudinal member. The reinforcement increases the torsional stiffness of the body in the vicinity of the wheelhouse without intruding into the interior of the vehicle.

11 Claims, 5 Drawing Sheets

MOTOR VEHICLE BODY WITH WHEELHOUSE/UNDERBODY REINFORCEMENT

FIELD OF THE INVENTION

The invention relates to a motor vehicle body having an underbody and a wheelhouse, and more specifically to such a body having a reinforced structure adjacent the wheelhouse to increase torsional rigidity.

BACKGROUND

Several types of motor vehicles (station wagons, hatchbacks, sport utility vehicles, etc.) have no permanent partition dividing the trunk from the passenger compartment, with the result that the trunk can be enlarged by folding the rear seat(s) forward. Some traditional sedans also have folding rear seats to provide a loading opening for an extra-long load carrying space. In the case of vehicles without a rear wall or with a rear wall with loading openings, a hinge effect is formed in the region of the junction between the underbody and the wheelhouse at either side of the vehicle, said hinge effect reducing the torsional rigidity of the entire vehicle body.

For various structural and practical reasons, torsional rigidity is difficult to achieve in this region. Any reinforcement fixed on the inside in the transition between the trunk and passenger compartment reduce the size of the loading opening. Furthermore, the fitting of reinforcements after assembly of the sidewall and underbody requires an additional, subsequent manufacturing step, and therefore increases manufacturing cost.

U.S. Pat. No. 5,829,824 discloses a motor vehicle body in which reinforcing struts extend between the left and right wheelhouses. This makes it possible to deepen the loading compartment itself without reducing the rigidity of the vehicle body. The resulting loading compartment enables relatively large objects to be carried. Here too, however, the reinforcing struts partially obstruct the loading opening of the compartment, and the fitting of the reinforcing struts adds to the manufacturing cost. In addition, the heads of the fasteners used to secure the reinforcing struts are exposed, with the result that said fasteners impair the visual impression and constitute a risk of damaging objects accommodated in the loading compartment.

European Patent No. 0 980 817 A2 discloses a vehicle body structure in which a shock absorber of the vehicle suspension system engages the lower surface of the underbody, with the result that the wheelhouse may be made narrower with a consequent increase in the width of the loading opening. Additional reinforcing or stiffening measures for improving the torsional rigidity in the region of the transition from the underbody to the wheelhouse are not proposed.

Taking the disadvantages described in the prior art as the starting point, the invention is based on the object of increasing the rigidity of a motor vehicle body having a loading opening provided in the region of the rear wheelhouses without having to reduce or otherwise obstruct the cross section of the loading opening.

SUMMARY OF THE INVENTION

The problem is solved according to the invention by providing a motor vehicle body comprising an underbody, a longitudinal member connected to an underside of the underbody, a wheelhouse connected to the underbody adjacent an outboard edge thereof and having an inboard surface laterally spaced from the longitudinal member, and a reinforcement disposed below the underbody and connected to the wheelhouse inboard surface and to the longitudinal member. By providing a structural connection between the wheelhouse inboard surface and the longitudinal member, the torsional stiffness of the body structure is greatly improved. Because the reinforcement is located below the underbody, it does not obstruct the loading opening and is not visible to the user of the vehicle.

In a preferred embodiment of the invention disclosed herein, the wheelhouse comprises a tower for accommodating a suspension component (such as a shock absorber or strut), the tower projecting from the inboard surface toward the longitudinal member. Since the tower increases the flexural rigidity of the wheelhouse, placement of the reinforcement adjacent the tower provides additional improvement in stiffness in the area of the wheelhouse and longitudinal member when the motor vehicle body is subjected to torsional strain.

Also in accordance with a preferred embodiment, the longitudinal member has an upward-opening U-shaped cross section, forming a sidewall and a lower surface. At least a portion of the reinforcement is of W-shaped cross-section and bears against the inboard surface of the wheelhouse, the underside of the underbody, and the sidewall and the lower surface of the longitudinal member. By this means, the reinforcement is fastened to as many parts as possible thereby resulting in a good, stable connection. The longitudinal member advantageously has a vertical weld flange in the region of the tower of the wheelhouse, which flange is fastened to an inner surface of the tower.

In an advantageous manner, a cross member is connected to the longitudinal member and extend in an inboard direction therefrom. The reinforcement is then fastened to the longitudinal member and/or the cross member preferably in the region of the junction between the longitudinal member and the cross member. This results in a particularly rigid connecting node between the wheelhouse, the longitudinal member and the cross member, which node directs bending moments of the wheelhouse directly into the cross member (and vice versa).

The W-shaped structure of the reinforcement can be interrupted by a diagonal section extending directly from the lower edge of the wheelhouse to the lower edge of the longitudinal member, which edge is formed at the junction between the sidewall and the lower surface of the longitudinal member. The diagonal section acts as an additional reinforcing measure and supports the lower surface of the wheelhouse directly on the lower surface of the longitudinal member, with the result that the motor vehicle body is stiffened with regard to an additional direction of application of force. Furthermore, the section eliminates the risk of the reinforcement buckling, said risk being caused by the shape of the W-shaped reinforcement.

In the case of a further advantageous refinement, the transversely disposed surface of the wheelhouse is directly connected to the web surface of the reinforcement. The direct connection of the transversely disposed surface of the wheelhouse to the web surface gives rise to an even higher node rigidity of the vehicle body in this region.

A further embodiment makes provision for the inner surface of the wheelhouse to be directly connected to the flange surface of the reinforcement. An arrangement of this type is expedient if the longitudinal member does not have a vertical flange and is directly connected to the inner surface of the wheelhouse. This is the case if, for example, the longitudinal member runs somewhat further inward toward the vehicle center, or there is no longitudinal member in the region of the tower. The task of the longitudinal member—the rigid connection to the inner surface of the wheelhouse—is then taken on by the flange surface of the reinforcement.

The invention will be explained in greater detail below with reference to a preferred exemplary embodiment.

DETAILED DESCRIPTION OF THE INVENTION

Figure 1:
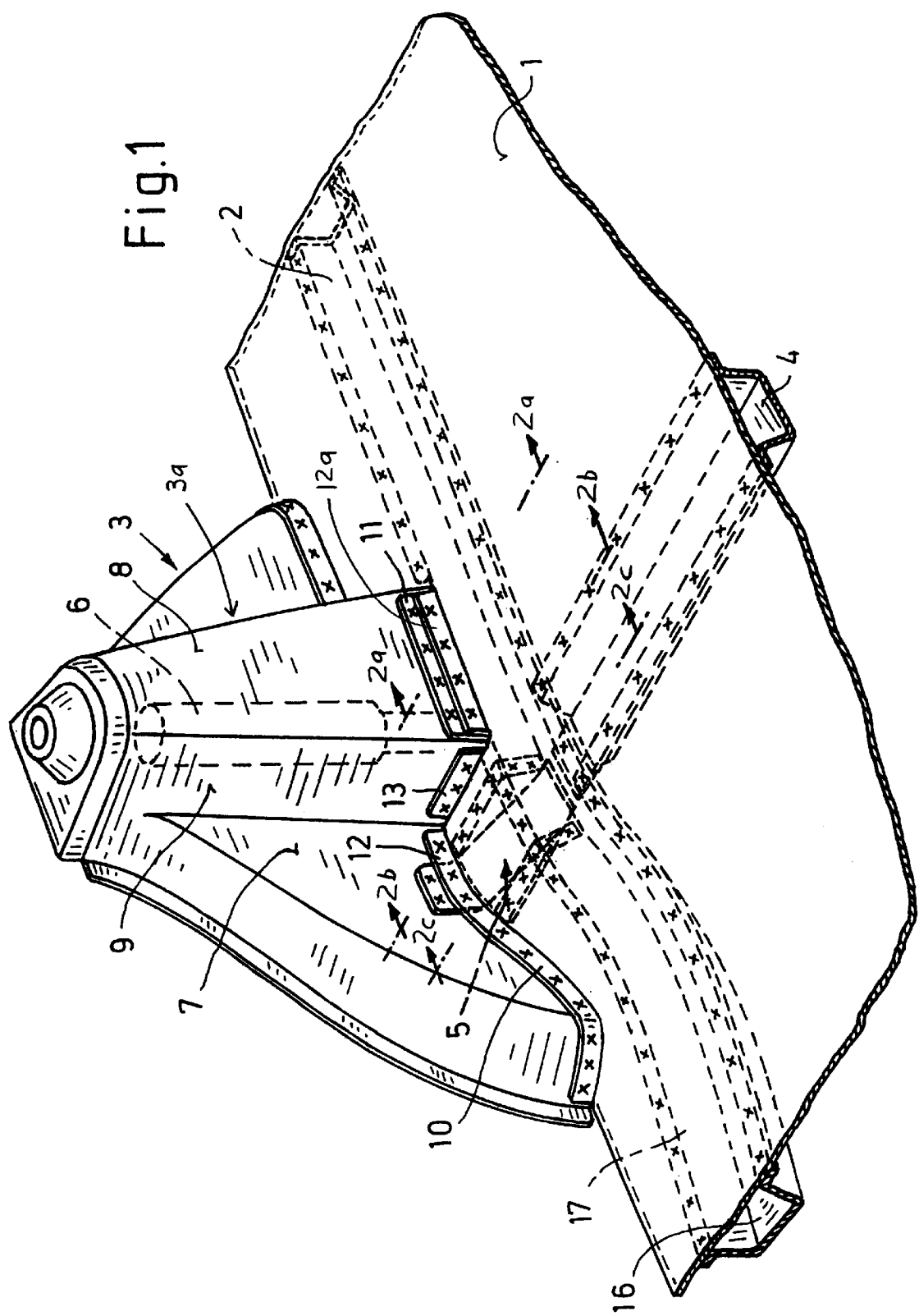
FIG. 1 shows a motor vehicle body having a wheelhouse and a reinforcement according to an embodiment of the invention.

As see inn FIG. 1, a portion of a motor vehicle body has an underbody 1, a longitudinal member 2 extending in the longitudinal direction of the motor vehicle, and a cross member 4 extending transversely with respect to the direction of travel. The longitudinal member 2 and cross member 4 serve to stiffen the vehicle body and are disposed below the underbody so that said members cannot be seen from the vehicle interior. A wheelhouse 3 extends essentially upward from the underbody 1, and a tower 3a is formed in the wheelhouse to accommodate a wheel suspension component 6 such as a spring strut or shock absorber. In the region of the wheelhouse 3, the longitudinal member 2 is provided with a vertical weld flange 11 that is fastened to an inner surface 8 of the wheelhouse 3, by means of spot welds (indicated throughout the drawings by X) in the region of the lower surface. Cross member 4 is shown located forward of the wheelhouse 3, but may alternatively be located rearward of the wheelhouse.

As used in this description, the terms such as "outboard," "outer" and "outward" indicate a direction or orientation away from or farther from a longitudinal centerline of the vehicle to which the described components relate. Conversely, "inboard," "inner" and "inward" indicate a direction or orientation toward or closer to the longitudinal centerline of the vehicle. Terms such as "forward," "rearward," "lateral," "longitudinal," "horizontal" and "vertical" refer to the orientation of a particular component relative to the vehicle as a whole.

The tower 3a forms an inner surface 8 disposed generally parallel to the longitudinal direction of the vehicle, and a surface 9 disposed generally transversely with respect to the longitudinal direction of the vehicle. The surface 9 merges into an inboard surface 7 disposed generally parallel to the longitudinal direction of the vehicle, it being possible for the surface 7 to lie both in front of and behind the tower 3a.

Vertical weld flanges 12 and 13 are provided on the underbody 1 and bear against the surfaces 7 and 9 in the lower region of the wheelhouse 3. In order to stiffen the motor vehicle body, a reinforcement 5 is fastened to the wheelhouse 3 in the lower region of the inboard surface 7. As best seen in FIG. 2b, at least a portion of the reinforcement 5 is of W-shaped cross-section and is fastened to the underbody 1 and to the sidewall 17 and the lower surface 16 of the longitudinal member 2. By this means, the inboard surface 7, in addition to being connected to the underbody 1, is also securely connected to the longitudinal member 2.

The reinforcement 5 is fastened to the longitudinal member 2 in the region of the junction between the longitudinal member 2 and cross member 4. This results in a particularly rigid connecting node formed by the cross member 4, longitudinal member 2 and the wheelhouse 3, connected by the reinforcement 5. In addition to the advantageous reduction in the hinge effect between the wheelhouse 3 and the underbody 1, the reinforcement 5 provides an additional path to transfer forces from the wheelhouse 3 into the longitudinal member 2.

Figure 2A:
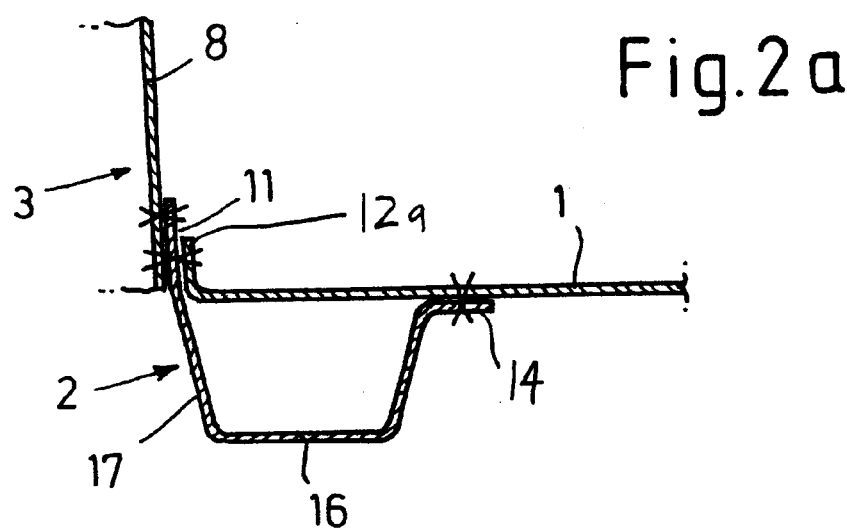
FIG. 2a shows a cross-section taken along line 2a—2a in FIG. 1.
Figure 2B:
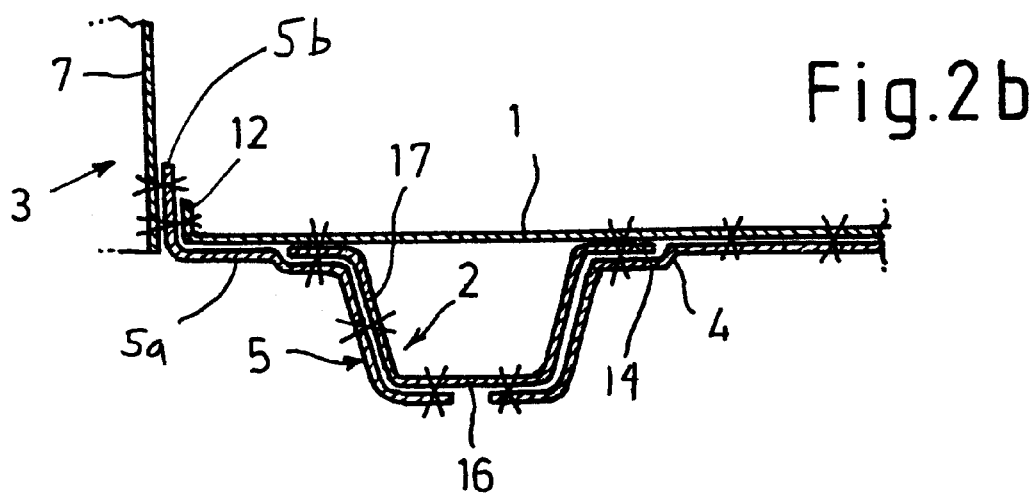
FIG. 2b shows a cross-section taken along line 2b—2b in FIG. 1.

In FIG. 2a, the fastening of the wheelhouse 3 is illustrated in the region of the inner surface 8. The longitudinal member 2 has a vertical weld flange 11 fastened to the inner surface 8 by means of spot welds. On the side facing away from the wheelhouse 3, the longitudinal member 2 has an essentially horizontal flange 14 fastened to the underbody 1, likewise by means of spot welds. The underbody 1 covers the longitudinal member 2 and, at its end facing the wheelhouse, is bent upward to form a weld flange 12a. The underbody 1 is then likewise fastened by means of spot welds to the vertical weld flange 11 of the longitudinal member 2 and therefore indirectly also to the wheelhouse 3. The vertical weld flange 11 enables forces occurring during driving to be transmitted from the wheelhouse 3 into the longitudinal member 2.

In FIG. 2b, the fastening of the wheelhouse 3 to the longitudinal member 2 in the region of the reinforcement 5 can be seen. On the inboard side of the longitudinal member 2, the cross member 4 is fastened to the lower surface 16 of the longitudinal member 2 by means of spot welds. The reinforcement 5 is arranged on the lower surface 16 of the longitudinal member 2, on its side adjacent the wheelhouse 3. The reinforcement 5 is of W-shaped cross-section and is fastened to the lower surface 16 and the sidewall 17 of the longitudinal member 2 by means of spot welds. At its outboard end, the reinforcement 5 initially has a section 5a extending parallel to the underbody 1 and ending in a vertical weld flange 5b which is fastened (together with the weld flange 12 of the underbody 1) to the lower region of the surface 7 by means of spot welds.

Figure 2C:
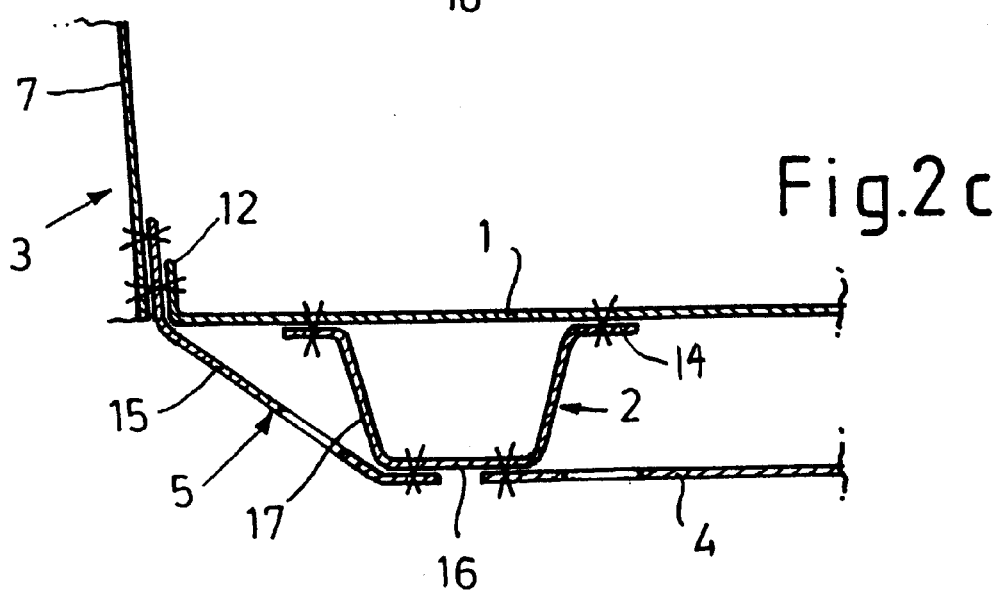
FIG. 2c shows a cross-section taken along line 2c—2c in FIG. 1.

In FIG. 2c, the fastening of the reinforcement 5 to the longitudinal member 2 and wheelhouse 3 can be seen. In this region the reinforcement 5 has a diagonal section 15 extending between the lower region of the wheelhouse 3 and the lower surface 16 of the longitudinal member 2. Diagonal section 15 therefore does not bear against the sidewall 17 of the longitudinal member 2 and against the underbody 1, but rather provides a direct connection between the inboard surface 7 of the wheelhouse 3 and lower surface 16 of the longitudinal member 2. The reinforcement 5 is therefore divided into two W-shaped edge regions that bear against the lower surface 16 and the sidewall 17 of the longitudinal member 2 and against the underbody 1 and the wheelhouse 3, and a diagonal section 15 disposed between the edge regions that provides the direct connection of the wheelhouse 3 and longitudinal member 2.

Figure 3:
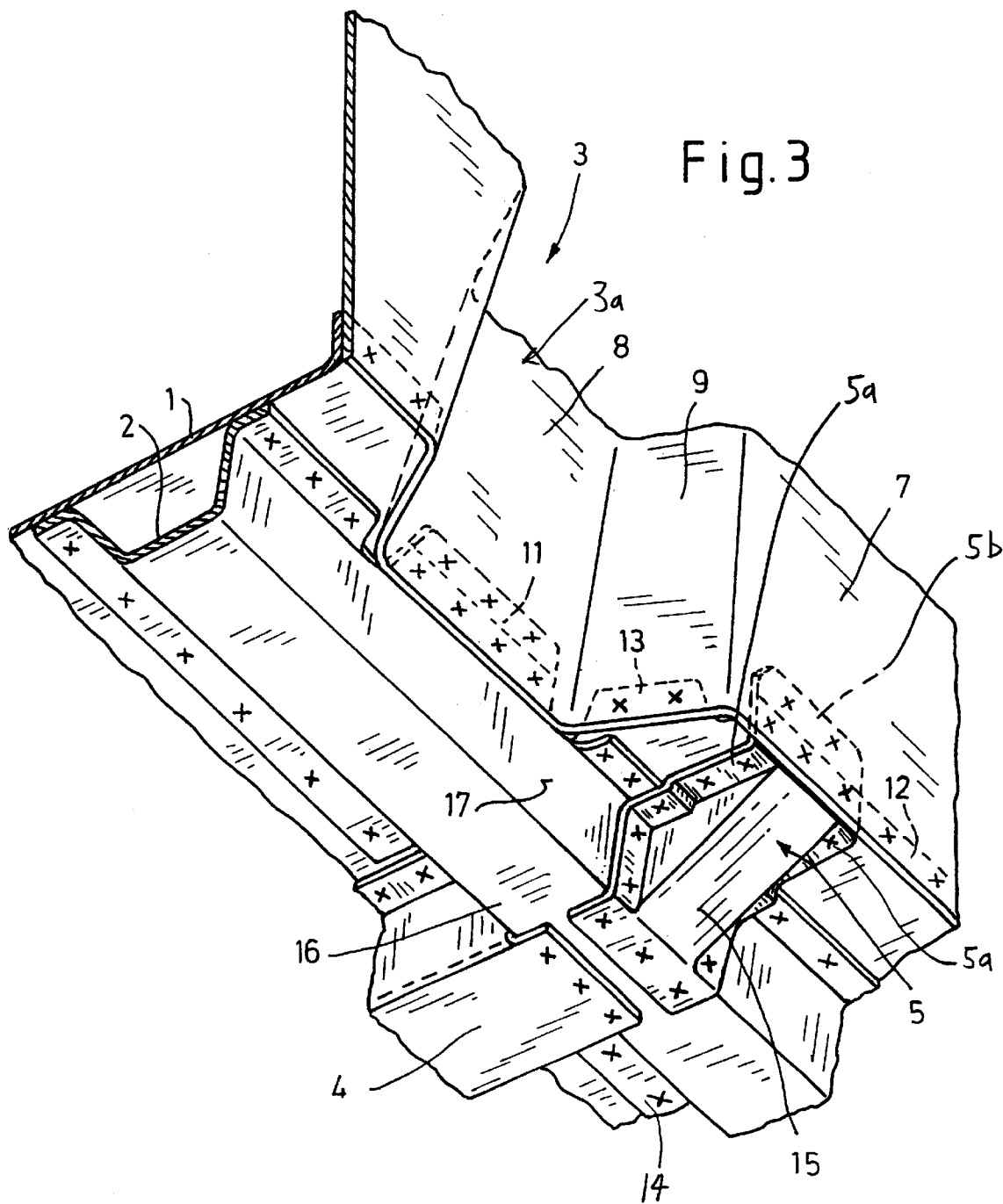
FIG. 3 shows the motor vehicle body of FIG. 1 in a view from below.

FIG. 3 provides an underside view of the vehicle body in the region of the reinforcement 5 between the wheelhouse 3 and longitudinal member 2. Both the cross member 4 and the reinforcement 5 are fastened to the lower surface of the longitudinal member 2 by means of spot welds. Over its further course, the reinforcement 5 is fastened by its edges to the sidewall 17, the underbody 1 and the wheelhouse 3 by means of spot welds. Diagonal section 15 does not bear against the longitudinal member sidewall 17 and the underbody 1, but connects the wheelhouse 3 directly to the longitudinal member lower surface 16.

The arrangement of the reinforcement 5 on the lower surface of the longitudinal member 2 and the underbody 1 provides the advantage that the part does not protrude into the vehicle interior. A substantial advantage of the arrangement is that in the manufacturing process the parts are joined together with little increase in cost because the cross member 4, longitudinal member 2 and reinforcement 5 are first fastened to one another in a subassembly by means of spot welds, and the wheelhouse 3 and the underbody 1 can then be fitted from above. The spot weld connections between the wheelhouse 3 and underbody 1 or reinforcement 5 easily accomplished and can be undertaken in a customary manner using welding tongs which reach through the rear door, hatch, or trunk opening. In contrast to the prior art, no subsequent, additional welding operations are therefore necessary for the reinforcement.

Reinforcement 5 is dimensioned to achieve the desired degree of stiffening, the thickness and extent of diagonal section 15 having particular importance. In addition to stiffening the motor vehicle body about the longitudinal axis, the reinforcement 5 provides the further advantage that forces can be introduced from the wheelhouse 3 into the longitudinal member 2 at an additional point, with the result that the forces are more widely distributed and the actual force-transmitting point on the welding flange 11 is not subjected to excessive strain.

The introduction of force from the suspension component 6 into the underbody subassembly takes place in the lower region of the surfaces 9 and 8 by means of vertical weld flanges 11 and 12 and therefore as close as possible to the suspension component 6, so that possible bending stresses are reduced or minimized.

Figure 4:
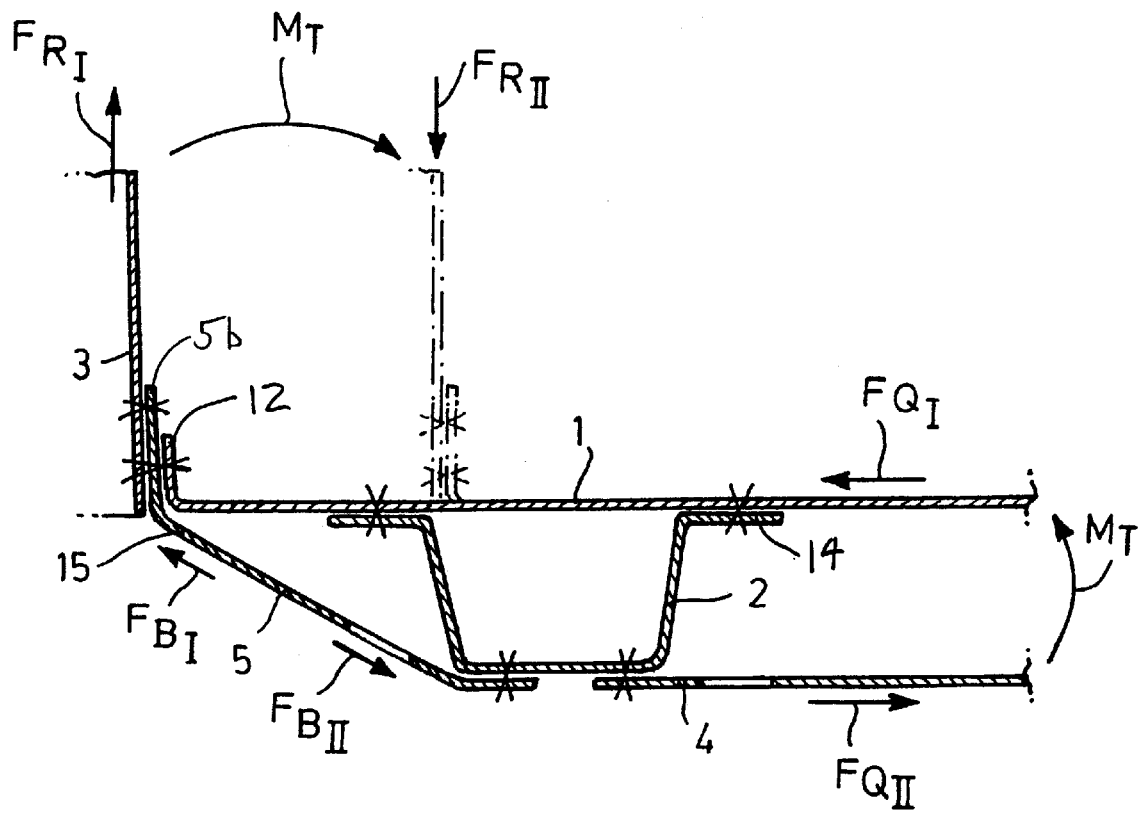
FIG. 4 shows the course of the forces in the motor vehicle body when subjected to torsional strain.

FIG. 4 illustrates the simplified course of forces of an ideal bending-moment load $M_T$ acting on the wheelhouse 3 and resulting inter alia from the motor vehicle body being subjected to torsional strain. The moment $M_T$ acts in a correspondingly opposed manner in the cross member 4. The moment $M_T$ is illustrated in a simplified manner via the pairs of forces $FQ_I$ and $FQ_{II}$ in the cross member and the forces $FR_I$ and $FR_{II}$, in the wheelhouse. The object of the reinforcement 5 is to deflect the force $FR_I$ onto the force $FQ_{II}$, as indicated by the tensile forces $FB_I$ and $FB_{II}$ acting in diagonal section 15. When subjected to an opposed torsional strain $M_T$, the direction of the forces is reversed from those indicated in FIG. 4. The reinforcement 5 and in particular the diagonal section 15 act in a stabilizing manner for the connection between the wheelhouse 3, underbody 1 and longitudinal member 2 and thus reduce, by means of the supporting action of the diagonal section 15, the hinge effect between the wheelhouse 3 and underbody 1.

Figure 5:
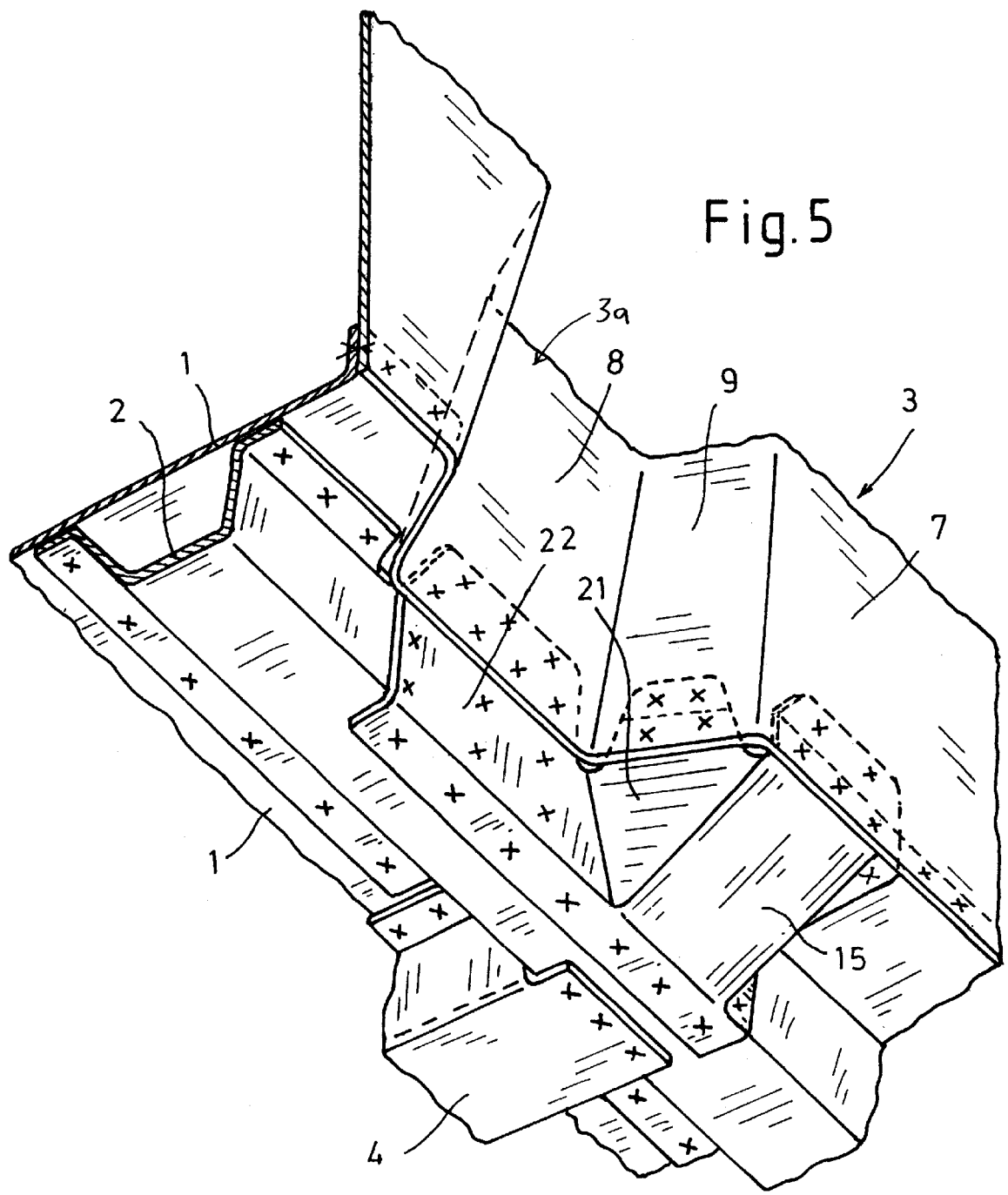
FIG. 5 shows a view of a second embodiment of the reinforcement.

FIG. 5 shows a second embodiment of the reinforcement 5 in which the transversely disposed surface 9 is connected substantially rectilinearly to a web surface 21 of the reinforcement. In this case, the function of the section 15 is fully retained and, in addition, an even better connection of the wheelhouse 3 to the underbody 1 is achieved via the web surface 21.

The direct connection of the inner surface 8 of the wheelhouse 3 to a flange surface 22 of the reinforcement is also shown. This enables the vertical weld flange 11 of the longitudinal member 2 to be omitted; its function is taken over by the flange surface 22.

The reinforcement may be located in front of or behind (as determined by the vehicle direction of travel) the tower. Two reinforcements can also be arranged on one wheelhouse, one forward and one rearward of the tower, which increases the rigidity of the vehicle body even further.

The reinforcement can also be designed as a single piece and can extend both in forward of and rearward of the tower. In this case, the reinforcement advantageously connects the inboard surfaces of the wheelhouse directly to the longitudinal member at two locations.

Various other modifications and variations will no doubt occur to those skilled in the arts to which this invention pertains. Such variations and modifications, which generally rely on the teachings through which this disclosure has advanced the art, are properly considered within the scope of this invention. This disclosure should thus be considered illustrative, not limiting; the scope of the invention is instead defined by the following claims.

What is claimed is:

1. A motor vehicle body having a longitudinal axis and a lateral axis, the body comprising:
    an underbody;
    a longitudinal member connected to an underside of the underbody and having a sidewall extending downwardly from the underside of the underbody and a lower surface;
    a cross member connected to the longitudinal member and extending inboard therefrom;
    a wheelhouse connected to the underbody adjacent an outboard edge thereof and having an inboard surface laterally spaced from the longitudinal member; and
    a reinforcement disposed substantially entirely below the underbody and bearing against the wheelhouse, the underside of the underbody, the sidewall, and the lower surface, the reinforcement connected to the wheelhouse inboard surface and to the longitudinal member adjacent to a junction between the longitudinal member and the cross member.

2. The motor vehicle body according to claim 1, wherein the reinforcement is fastened to a lower surface of the longitudinal member.

3. The motor vehicle body according to claim 1, wherein the reinforcement has a section extending directly between the wheelhouse inboard surface and a lower surface of the longitudinal member.

4. The motor vehicle body according to claim 1, wherein the wheelhouse further comprises a tower projecting from the inboard surface toward the longitudinal member, and the longitudinal member has an upwardly projecting weld flange fastened to a surface of the tower.

5. The motor vehicle body according to claim 4, wherein the tower comprises a longitudinal surface disposed generally parallel to the longitudinal axis of the vehicle, and two transverse surfaces disposed generally parallel with the transverse axis of the vehicle.

6. The motor vehicle body according to claim 5, wherein the transverse surface of the tower is directly connected to a web surface of the reinforcement.

7. The motor vehicle body according to claim 5, wherein the longitudinal surface of the tower is directly connected to a flange surface of the reinforcement.

8. The motor vehicle body according to claim 4, wherein the reinforcement is disposed in front of the tower.

9. A motor vehicle body having a longitudinal axis and a lateral axis, the body comprising:

an underbody;

a longitudinal member connected to an underside of the underbody and having an upwardly projecting weld flange;

a cross member connected to the longitudinal member at a junction and extending inboard therefrom;

a wheelhouse connected to the underbody adjacent an outboard edge thereof and having an inboard surface laterally spaced from the longitudinal member, and further having a tower projecting from the inboard surface toward the longitudinal member, the upwardly projecting weld flange of the longitudinal member being fastened to a surface of the tower; and a reinforcement disposed substantially entirely below the underbody and connected to the wheelhouse inboard surface and to the longitudinal member adjacent to the junction of the longitudinal member and the cross member.

10. The motor vehicle body according to claim 9 wherein the longitudinal member has a sidewall extending downwardly from the underside of the underbody and a lower surface, and the reinforcement comprises:

a W-shaped section that bears against the wheelhouse, the underside of the underbody, the sidewall, and the lower surface; and a section extending directly between the wheelhouse inboard surface and the lower surface.

11. The motor vehicle body according to claim 10 wherein the reinforcement further comprises a second W-shaped section, the two W-shaped sections constituting edge regions disposed on either side of the section extending directly between the wheelhouse inboard surface and the lower surface.

* * * * *